United States Patent
Bhandari et al.

(10) Patent No.: US 10,296,963 B2
(45) Date of Patent: May 21, 2019

(54) PREDICTIVE MODELING FOR UNINTENDED OUTCOMES

(71) Applicant: Accenture Global Services Limited, Dublin (IE)

(72) Inventors: Maneesh Bhandari, Karnataka (IN); Kaushal Mody, Maharashtra (IN); Bhavana Rao, Karnataka (IN); Madhura Shivaram, Karnataka (IN); Monali More, Karnataka (IN)

(73) Assignee: Accenture Global Services Limited, Dublin (IE)

( * ) Notice: Subject to any disclaimer, the term of this patent is extended or adjusted under 35 U.S.C. 154(b) by 823 days.

(21) Appl. No.: 14/974,173

(22) Filed: Dec. 18, 2015

(65) Prior Publication Data
US 2017/0124631 A1   May 4, 2017

(30) Foreign Application Priority Data
Oct. 28, 2015  (IN) .............................. 5801CHE2015

(51) Int. Cl.
*G06Q 30/00*   (2012.01)
*G06Q 10/00*   (2012.01)
(Continued)

(52) U.S. Cl.
CPC ......... *G06Q 30/0633* (2013.01); *G06N 7/005* (2013.01)

(58) Field of Classification Search
CPC ............................... G06Q 10/00; G06Q 50/00
(Continued)

(56) References Cited

U.S. PATENT DOCUMENTS 6,182,070 B1 *  1/2001  Megiddo ............. G06F 16/2465
                                                                707/694
6,473,794 B1 * 10/2002  Guheen .................. H04L 41/22
                                                                709/223

(Continued)

OTHER PUBLICATIONS

Attenberg, Josh, Sandeep Pandey, and Torsten Suel. "Modeling and predicting user behavior in sponsored search." Proceedings of the 15th ACM SIGKDD international conference on Knowledge discovery and data mining. ACM, 2009 (Year: 2009).*

*Primary Examiner* — Alan S Miller
(74) *Attorney, Agent, or Firm* — Fish & Richardson P.C.

(57) ABSTRACT

Methods, systems, and apparatus, including computer programs encoded on a computer storage medium, for predictive modeling for unintended outcomes are disclosed. In one aspect, a method includes the actions of accessing an order history that, for each of one or more past orders, indicates (i) one or more order details associated with the order, and (ii) a fulfillment outcome associated with the order. The actions further include selecting one or more particular past orders that are associated with the particular unintended order fulfillment outcome. The actions further include generating a predictive model. The actions further include receiving one or more order details associated with a subsequently received order. The actions further include providing the one or more order details as input to the predictive model. The actions further include, identifying a remedial action. The actions further include providing data indicating the remedial action.

20 Claims, 9 Drawing Sheets

(51) Int. Cl.
*G06Q 30/06* (2012.01)
*G06N 7/00* (2006.01)

(58) Field of Classification Search
USPC .............................................. 705/7.11–7.42
See application file for complete search history.

(56) References Cited

U.S. PATENT DOCUMENTS

| | | | |
|---|---|---|---|
| 7,519,566 B2* | 4/2009 | Prigogin | G06Q 10/06 706/21 |
| 8,370,280 B1* | 2/2013 | Lin | G06N 20/00 706/12 |
| 9,251,484 B2* | 2/2016 | Cantor | G06Q 10/0633 |
| 2002/0107853 A1* | 8/2002 | Hofmann | G06F 16/335 |
| 2005/0177414 A1* | 8/2005 | Priogin | G06Q 10/06 706/21 |
| 2007/0061255 A1* | 3/2007 | Epting | G06Q 20/10 705/39 |
| 2013/0030958 A1* | 1/2013 | Michalski | G06Q 10/06315 705/26.81 |
| 2013/0275273 A1* | 10/2013 | Champlin | G06Q 10/02 705/26.81 |
| 2013/0325763 A1* | 12/2013 | Cantor | G06Q 10/0633 706/12 |
| 2013/0346232 A1* | 12/2013 | Ellison | G06Q 30/0631 705/26.7 |
| 2014/0156568 A1* | 6/2014 | Ganguly | G06Q 10/0637 706/12 |
| 2014/0222594 A1* | 8/2014 | Rose | G06Q 20/12 705/16 |
| 2015/0142611 A1* | 5/2015 | Kaplan | G06Q 30/0635 705/26.81 |
| 2015/0235299 A1* | 8/2015 | Dhillon | G06Q 30/0633 705/26.81 |

\* cited by examiner

FIG. 4

PREDICTIVE MODELING FOR UNINTENDED OUTCOMES

CROSS REFERENCE TO RELATED APPLICATION

This application claims the benefit of Indian Patent Application No. 5801/CHE/2015, filed on Oct. 28, 2015, the contents of which are incorporated by reference.

TECHNICAL FIELD

This application generally relates to predictive modeling.

BACKGROUND

Predictive modeling is a process used in predictive analytics to create a statistical model of future behavior. Predictive analytics is the area of data mining concerned with forecasting probabilities and trends.

SUMMARY

Entities may apply predictive models to future orders to identify orders that are likely to end in an unintended fulfillment outcome. Once an entity has identified an unintended fulfillment outcome, the entity may adjust the order to reduce the risk of an unintended fulfillment outcome. The adjustment may be selected from a group of pre-determined remedial actions that are intended to decrease the likelihood of particular unintended fulfillment outcomes. The adjustment may take place at any phase of the order, and may range from splitting an order into smaller orders to automatically notifying the purchaser of an outstanding invoice.

An innovative aspect of the subject matter described in this specification may be implemented in a method that includes the actions of accessing an order history that, for each of one or more past orders, indicates (i) one or more order details associated with the order, and (ii) a fulfillment outcome associated with the order, wherein the order fulfillment outcome is selected from among multiple pre-defined order fulfillment outcomes including one or more intended order fulfillment outcomes and one or more unintended order fulfillment outcomes; for each of one or more particular unintended order fulfillment outcomes, selecting one or more particular past orders that are associated with the particular unintended order fulfillment outcome; for each of the one or more particular unintended order fulfillment outcomes, generating, using the one or more order details associated with the one or more particular past orders that are associated with the particular unintended order fulfillment outcome as training data, a predictive model that is trained to estimate, based on one or more given order details associated with a given order, a likelihood that the given order will be associated with the particular unintended order fulfillment outcome; receiving one or more order details associated with a subsequently received order; for each of the predictive models, providing the one or more order details as input to the predictive model; in response to providing the one or more order details as input to the predictive model, receiving, from each of the predictive models, a likelihood that the one or more order details will be associated with the particular unintended order fulfillment outcome; determining, for each indication of the likelihood, whether the likelihood satisfies a threshold; for likelihoods that satisfy the threshold, identifying a remedial action that, when implemented, adjusts the likelihood to not satisfy the threshold; and providing, for output, data indicating the remedial action.

These and other implementations can each optionally include one or more of the following features. The one or more order details comprise goods ordered, a quantity of each good, a total value, and a purchaser. The predictive model is purchaser specific. The one or more unintended order fulfillment outcomes comprise late payment, order dispute, and order cancellation. The remedial action comprises dividing an order, generating a target invoice date, notifying a purchaser of an outstanding invoice, or applying a discount. The actions further include preventing an order associated with the one or more order details from processing until execution of the remedial action. The remedial action is associated with an order receiving stage, a billing stage, or a collection stage.

Other implementations of this aspect include corresponding systems, apparatus, and computer programs recorded on computer storage devices, each configured to perform the operations of the methods.

Another innovative aspect of the subject matter described in this specification may be implemented in a method that includes the actions of accessing an order history that, for each of one or more past orders, indicates (i) one or more order details associated with the order, and (ii) a fulfillment outcome associated with the order, wherein the order fulfillment outcome is selected from among multiple pre-defined order fulfillment outcomes including one or more intended order fulfillment outcomes and one or more unintended order fulfillment outcomes; for each of one or more particular unintended order fulfillment outcomes, selecting one or more particular past orders that are associated with the particular unintended order fulfillment outcome; for each of the one or more particular unintended order fulfillment outcomes, generating, using the one or more order details associated with the one or more particular past orders that are associated with the particular unintended order fulfillment outcome as training data, a predictive model that is trained to estimate, based on one or more given order details associated with a given order, a likelihood that the given order will be associated with the particular unintended order fulfillment outcome; and using one or more of the predictive models to estimate a likelihood that a subsequently received order will be associated with one or more of the unintended order fulfillment outcomes.

These and other implementations can each optionally include one or more of the following features. The one or more order details comprise goods ordered, a quantity of each good, a total value, and a purchaser. The predictive model is purchaser specific. The one or more unintended order fulfillment outcomes comprise late payment, order dispute, and order cancellation. The one or more intended order fulfillment outcomes comprises a timely, received payment. The predictive model is generated using logistic regression, support vector machine, random forest, multiple linear regression, Bayes' theorem.

Other implementations of this aspect include corresponding systems, apparatus, and computer programs recorded on computer storage devices, each configured to perform the operations of the methods.

Another innovative aspect of the subject matter described in this specification may be implemented in a method that includes the actions of accessing, for each of one or more particular unintended order fulfillment outcomes, a predictive model that is trained to estimate, based on one or more given order details associated with a given order, a likelihood that the given order will be associated with the particular unintended order fulfillment outcome; receiving one or more order details associated with a subsequently received order; for each of the predictive models, providing the one or more order details as input to the predictive model; in response to providing the one or more order details as input to the predictive model, receiving, from each of the predictive models, a likelihood that the one or more order details will be associated with the particular unintended order fulfillment outcome; determining, for each indication of the likelihood, whether the likelihood satisfies a threshold; for likelihoods that satisfy the threshold, identifying a remedial action that, when implemented, adjusts the likelihood to not satisfy the threshold; and providing, for output, data indicating the remedial action.

These and other implementations can each optionally include one or more of the following features. The one or more order details comprise goods ordered, a quantity of each good, a total value, and a purchaser. The predictive model is purchaser specific. The one or more unintended order fulfillment outcomes comprise late payment, order dispute, and order cancellation. The remedial action comprises dividing an order, generating a target invoice date, notifying a purchaser of an outstanding invoice, or applying a discount. The actions further include preventing an order associated with the one or more order details from processing until execution of the remedial action. The remedial action is associated with an order receiving stage, a billing stage, or a collection stage.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A system may identify orders that are likely not going to be fulfilled and collected and provide solutions to increase the likelihood that the orders will be fulfilled and collected.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3-6A illustrate example user interfaces for processing and invoicing orders for goods.

Like reference numbers and designations in the various drawings indicate like elements.

DETAILED DESCRIPTION

Entities such as businesses keep track of goods sold by entering orders into a computer system and generate invoices based on the entered orders. The companies purchasing the goods receive and pay the invoices. Once the entities receive payments they mark the invoice as paid and the order as complete.

Whenever a company purchases goods from another company, many pieces need to fall into place so that the company purchasing the goods receives the correct order on time and the company selling goods receives payment on time. Sometimes the order contains errors, purchasing companies dispute or cancel orders, or the purchasing company settles the invoice after the due date. To avoid these problems, it would be helpful for a seller to identify orders that are likely to cause problems and correct those problems before processing the order.

A seller may store previous order history that includes details related to purchasers, goods sold, prices, delivery dates, and delivery locations. The order history also includes details related to the outcome of the order such as whether the order included an error, was cancelled, and was disputed. The details may also include the number of days after the due date that the purchaser paid the invoice or whether purchaser paid the invoice on time. Based on the order history, an order taking system may generate a predictive model that may generate the likelihood of various fulfillment outcomes based on order details.

The seller may apply the predictive models to future orders to identify orders that are likely to end in an unintended fulfillment outcome. Once seller has identified an unintended fulfillment outcome, the seller may adjust the order to reduce the risk of an unintended fulfillment outcome. The adjustment may be selected from a group of pre-determined remedial actions that are intended to decrease the likelihood of particular unintended fulfillment outcomes. The adjustment may take place at the ordering, billing, or collection phase of the order and may range from splitting an order into smaller orders to calling the purchaser of an outstanding invoice.

Figure 1:
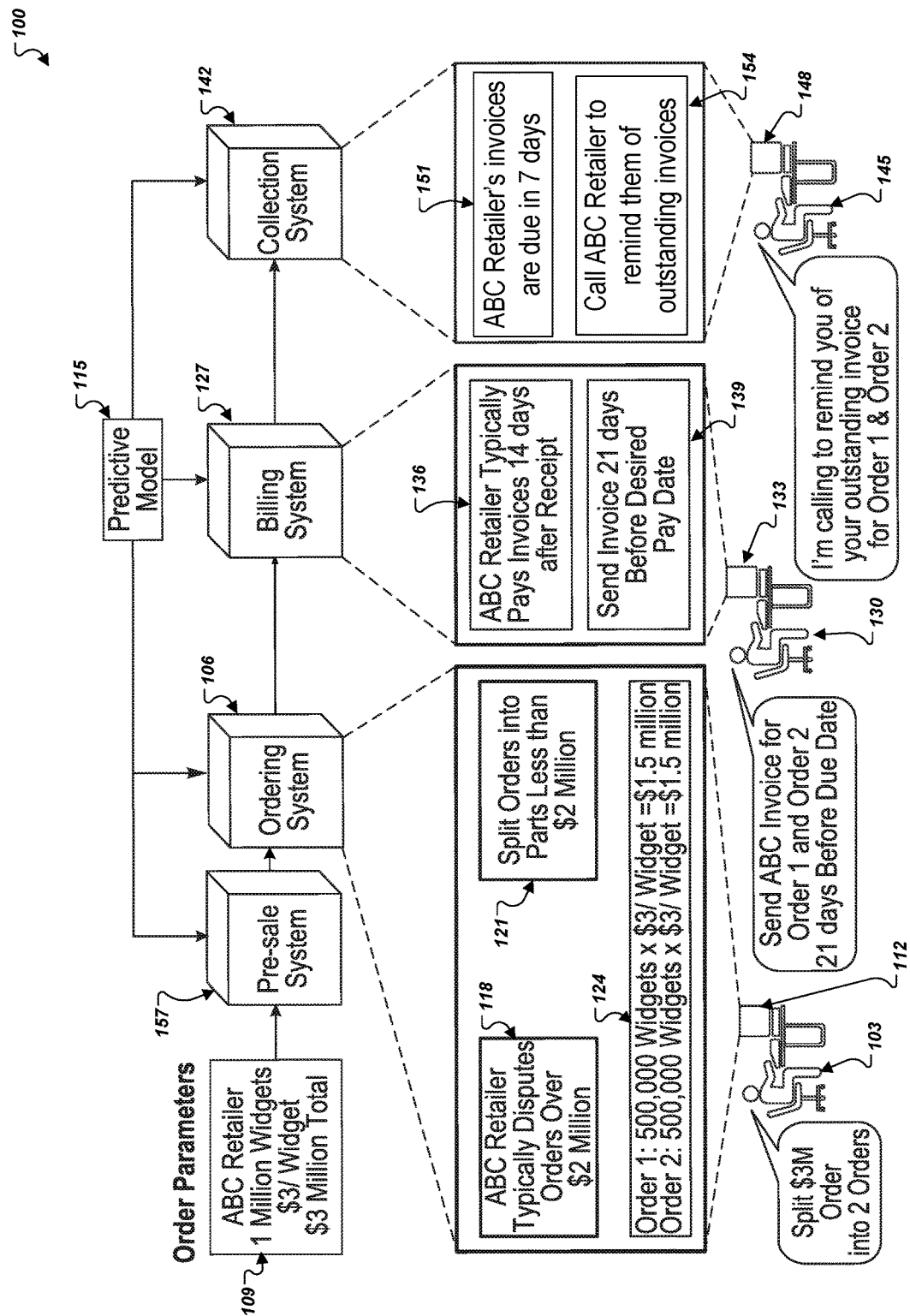
FIG. 1 illustrates an example system for processing and invoicing orders for goods.

FIG. 1 illustrates an example system 100 for processing and invoicing orders for goods. Briefly, and as described in further detail below, the system 100 assists users at the ordering stage, billing stage, and/or the collection stage to ensure that situations that typically lead to unintended fulfillment outcomes, such as cancelled orders or delayed payments are less likely to occur. The system 100 suggests remedial actions that users may perform at the ordering stage, billing stage, or collection stage to decrease the likelihood of unintended fulfillment outcomes.

In the example shown in FIG. 1, the user 103 is operating the ordering system 106. The user 103 receives an order 109 from ABC Retailer for widgets. The order 109 is for one million widgets, and at three dollars for each widget the total for the order 109 is three million dollars. The user 103 inputs the order details into the user ordering interface 112 of the ordering system 106. The ordering system 106 applies the predictive model 115 to the order details to identify likelihoods that the order 109 will cause one or more unintended order fulfillment outcomes. In some implementations, the system 100 includes a pre-sale system 157. The pre-sale system 157 allows sales agents to input order details that the pre-sale system 157 can apply to the predictive model 115. The pre-sale system 157 may operate similar to the ordering system 106, billing system 127, and collection system 142 with respect to applying the predictive model 115. As discussed below with respect to FIG. 6A, the pre-sale system 157 may provide recommendations to the sales agent when the sales agent is negotiating an order to reduce the likelihood of unintended fulfillment outcomes.

The system 100 generates the predictive model 115 by processing previous orders and each order's corresponding fulfillment outcome. The system 100 applies various statistical techniques that will be discussed in detail below to identify patterns in the previous orders to be able to predict a likelihood that a particular fulfillment outcome will occur given the details of a particular order. The order details may be related to the identity of the purchaser, the type of purchaser, the goods purchased, the total value, the location of the purchaser, the delivery location of the goods, the purchase date, the delivery date, or other similar order details.

Based on the ordering system 106 applying the predictive model to the order 109, the ordering system 106 identifies an elevated likelihood that the purchaser will dispute the order because the total value of order 109 is three million dollars. The ordering system 106 determines that the risk of the purchaser disputing the order 109 reaches an acceptable threshold if the order 109 is split into multiple orders each with a value below two million dollars. In the example shown in FIG. 1, the ordering system 106 provides, to the user 103 through the user ordering interface 112, an order prediction 118 that indicates the purchaser typically disputes orders over 2 million dollars. The ordering system 106 provides instructions 121 to the user 103 to split the order 109 into smaller orders that each have a total value less than two million dollars. In some implementations, the ordering system 106 requires the user 103 implement the instructions 121 before the user 103 can submit the order for processing. The user 103 splits the order 109 into multiple orders 124, each with a value of 1.5 million dollars, which is less than the two million dollar threshold.

Once the user 103 enters the order 109 into the ordering system 106, the system 100 transmits the order 109 to the billing system 127. The user 130 interacts with the billing system through the billing user interface 133. The user 130 generates invoices for the orders and sends the invoices to each purchaser. Similar to the ordering system 106, the billing system 127 applies the predictive model 115 to the order 109. In some implementations, the billing system 127 applies a different predictive model than the predictive model applied by the ordering system 106. For example, the ordering system 106 applies a predictive model to identify likelihoods that order related details lead to one or more particular unintended order fulfillment outcomes. The billing system 127 applies a predictive model to identify likelihoods that billing related details lead to one or more particular unintended order fulfillment outcomes. In some implementations, the ordering system 106 and billing system 127 may apply the same predictive model.

In the example shown in FIG. 1, the billing system 127 applies the predictive model 115 and determines an increased likelihood that the purchaser will pay the invoices late for order 109 if the invoices are sent less than fourteen days before the desired pay date. The billing system 127 provides prediction 136 to the user 130 through the billing user interface 133. To reduce the likelihood of late payment by the purchaser, the billing system 127 provides instructions 139 to the user 130 to send the invoices twenty-one days before the desired pay date. Similar to the ordering system 106, the billing system 127 may require that the user 130 execute the instructions 139.

Once the user 130 processes the order 109 in the billing system 127, the system 100 transmits the order 109 to the collection system 142. The user 145 interacts with the collection system through the collection user interface 148. The user 145 may be responsible for ensuring that invoices sent by the billing system 127 are collected before the due date. The billing system 127 may apply the predictive model 115 to identify potential unintended order fulfillment outcomes and based on the likelihoods of the unintended order fulfillment outcomes identify potential remedial actions.

In the example shown in FIG. 1, the collection system 142 determines that the invoices sent by the billing system 127 to the purchaser are seven days away from being due. Using the predictive model, the collection system 142 identifies an increased likelihood that the purchaser will pay late since fourteen days have passed since the purchaser received the invoices. The collection system 142 provides this information 151 to the user 145 through the collection user interface 148. The collection system 142 also identifies a remedial action 154 that instructs the user 145 to call the purchaser to remind the purchaser of the outstanding invoices. In some implementations, the collection 142 may require that user 145 to confirm that the user 145 has performed the remedial action 154.

In some implementations, the system 100 applies the predictive model 115 only to the ordering system 106 and not to the billing system 127 or the collection system 142. The user operating the ordering system 106 may receive instructions from the ordering system 106 that are to be executed during the billing and collection stages. In this instance, the user may enter the instructions and during the billing and collection stages, the user operating the billing system 127 or the collection system 142 views the instructions and performs the remedial action. In instances where the remedial action is performed by the user operating the ordering system 106, the ordering system 106 may reapply the predictive model 115 after the user performs the remedial action. For example, the ordering system 106 may reapply the predictive model 115 after user 103 performs the remedial action 124.

In some implementations, the system 100 applies the predictive model 115 to the order 109 by applying multiple predictive models. The order in which the system 100 applies the multiple predictive models may be different for different purchasers. For example, with ABC Retailer, the system 100 may apply a predictive model to determine the likelihood of a cancelled order and then apply a predictive model to determine the likelihood of an order dispute. In some implementations, after applying the predictive model to determine the likelihood of a cancelled order, the system 100 may provide remedial actions for the user to perform and then apply the predictive model to determine the likelihood of an order dispute. As another example, with DEF Retailer, the system 100 may apply the predictive model to determine the likelihood of an order dispute and then apply the predictive model to determine the likelihood of a cancelled order. In some implementations, the system 100 may simultaneously apply multiple predictive models to the order 109, provide remedial actions for the user to perform, then reapply the predictive models. In some implementations, the order in which the system 100 applies the multiple predictive models may be different based on the order details. For example, if the total price of the order is greater than one million dollars, the system 100 may apply a predictive model to determine the likelihood of a cancelled order and then apply a predictive model to determine the likelihood of an order dispute. After applying the predictive model to determine the likelihood of a cancelled order, the system 100 may provide remedial actions for the user to perform and then apply the predictive model to determine the likelihood of an order dispute. In some implementations, the system 100 may apply particular predictive models based on the order details. For example, the system may only apply a predictive model to determine the likelihood of a cancelled order if the delivery location is in a particular region.

Figure 2:
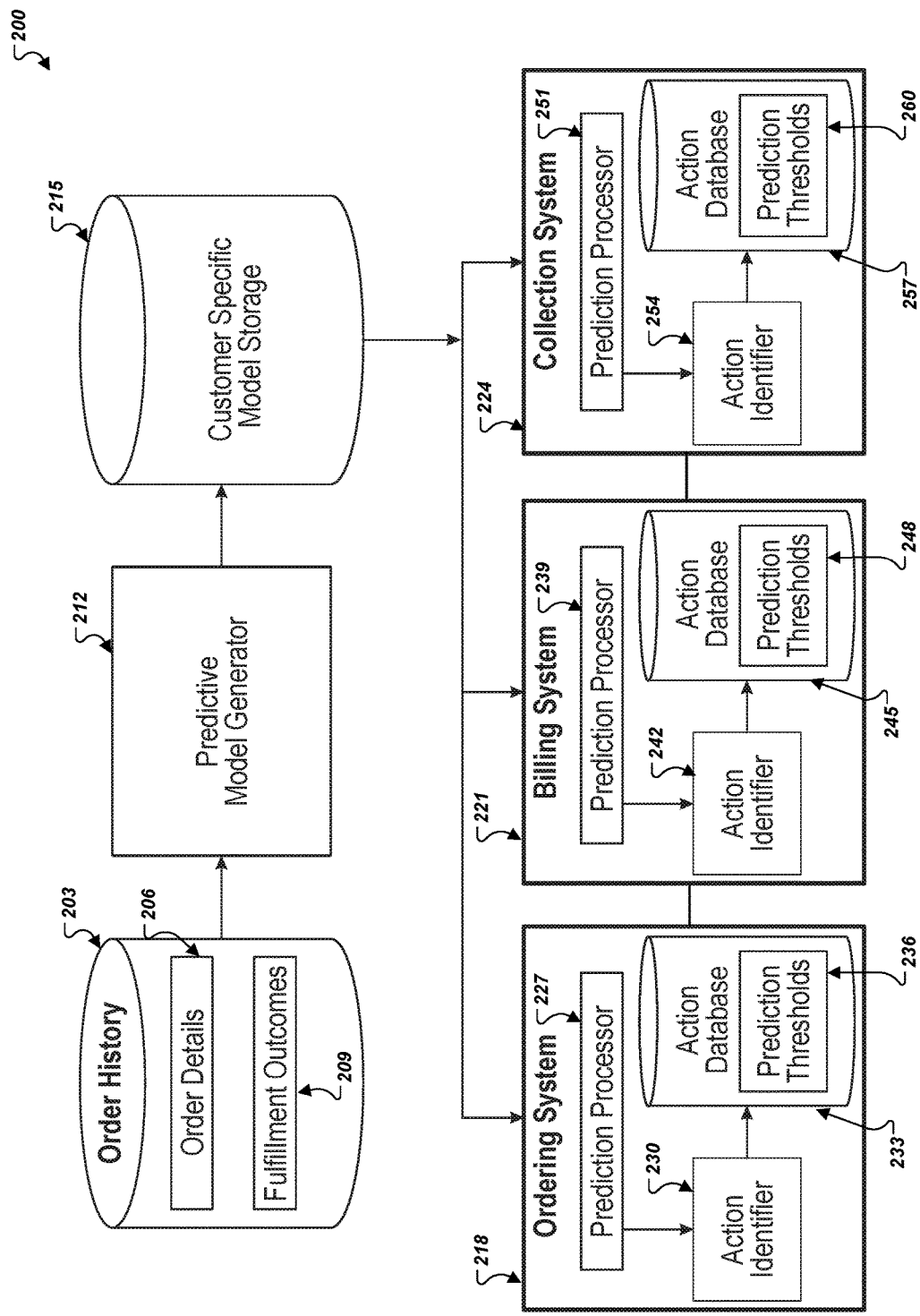
FIG. 2 illustrates an example system for generating predictive models for processing and invoicing orders for goods.

FIG. 2 illustrates an example system 200 for generating predictive models for processing and invoicing orders for goods. Briefly, and as described in further detail below, the system 200 access previous order data and uses that data as training data to generate a predictive model. The ordering, billing, and collections systems use the predictive models to calculate likelihoods of unintended fulfillment outcomes and identify remedial actions to decrease the likelihoods of unintended fulfillment outcomes to satisfy a threshold.

The system stores previous order history data in the order history storage 203. The order history storage 203 includes, for each previous order, order details 206 and fulfillment outcomes 209. The order details 206 may include data identifying the purchaser, the goods sold, the quantity of the goods sold, the total value, the date of sale, the date of delivery, the location of the purchaser, the location of delivery, and other similar order details. The fulfillment outcomes 209 may be split into unintended outcomes such as order cancellation, errors in the order, problems with the turnaround time, order holding, payment dispute, late payment, high order frequency relative to billing cycle times, order contingencies or provisions, or other similar outcomes. The other fulfillment outcome 209 is the intended outcome where the order is processed, goods are delivered, and payment is received as requested by the seller and purchaser.

The order history storage 203 provides the order history data to the predictive model generator for use as training data. The predictive model generator 212 applies statistical techniques to order history data to generate a model that computes a likelihood of various unintended fulfillment outcomes. The predictive model may also generate a likelihood of an intended fulfillment outcome. The statistical techniques include logistic regression, support vector machine, random forest, multiple linear regression, neural networks, and Bayes' theorem. The predictive model may be specific for a particular purchaser, group of purchasers, a particular region where a purchaser may be located, or a particular region where the goods are to be delivered. The system 200 stores the predictive models in the customer specific model storage 215. In implementations, where the predictive models are not customer specific, the customer specific model storage 215 may be a predictive model storage.

As an example, a predictive model for ABC Retailer may receive order details indicating that ABC Retailer would like to purchase one million widgets for delivery in three months to ABC Retailer's warehouse in New York City. The cost of each widget is three dollars. The predictive model generates, based on those order details, that the probability of an order cancellation is eight percent; the probability of the order containing an error either by ABC Retailer, the seller, or both; the probability the order being placed on hold is twenty percent; the probability of an order dispute is eighty-eight percent; and the probability of late payment is ninety-two percent.

In some implementations, the predictive model generator 212 may require a certain amount of training data before generating a predictive model. For example, the predictive model generator 212 may require thirty days or two years of order details for a particular customer or purchaser. As another example, the predictive model generator 212 may require fifty orders for a particular customer.

The system 200 provides a customer specific predictive model to the ordering system 218, the billing system 221, and the collection system 224. The ordering system 218, the billing system 221, and the collection system 224 apply the predictive model at various stages of the order processing process to identify actions that a user can take to reduce the chances of an unintended fulfillment outcome.

The ordering system 218 includes a prediction processor 227. The prediction processor 227 receives the order details that are inputted by the user taking the order and applies a predictive model to generate the likelihoods for unintended fulfillment outcomes. In some implementations, the predictive models may be based on order details received from a specific seller. For example, XYZ seller may have order details for orders from several purchasers. The predictive model generator 212 generates a predictive model based on the order details from XYZ's orders. This predictive model may be provided to the prediction processor 227.

The prediction processor 227 provides the likelihoods for unintended fulfillment outcomes to the action identifier 230. The action identifier 230 identifies actions that the user taking the order may perform to reduce the likelihoods for unintended fulfillment outcomes. The action identifier 230 accesses the action database 233 that includes the prediction thresholds 236. The prediction thresholds 236 stores the thresholds that the likelihood for an unintended fulfillment outcome should satisfy before the action identifier will identify a remedial action to decrease the likelihood. The prediction thresholds 236 may be provided by the seller or may be set at a default threshold. For example, XYZ seller may set the prediction thresholds such that the probability of any unintended fulfillment outcome should not be less than eighty percent. The prediction thresholds provided by XYZ seller may also be specific to a particular unintended fulfillment outcome. For example, XYZ seller may require that the probability of a cancelled order be less than fifty percent and the probability of an order including errors be less than eight percent.

The action identifier 230 identifies actions from the action database 233 and applies them to the order details. The prediction processor 227 may then reapply the predictive model to the revised order details to determine whether the new likelihoods for an unintended fulfillment outcomes satisfy the prediction thresholds. For the actions that do decrease likelihoods below a corresponding prediction threshold, the action identifier 230 may instruct the user to perform the remedial action. In some implementations, the action identifier 230 may instruct the user to perform a remedial action that reduces a likelihood for an unintended fulfillment outcome even if the remedial action does not reduce the likelihood below the corresponding threshold.

The actions stored in the action database 233 include remedial actions that user of the ordering system 218 may perform during the order taking process. The actions may be provided by the selling company or may be a collection of default actions provided by the system 200. The actions may include inputting instructions for users to perform later in the order processing steps. For example, the action may include inputting an instruction for the user of the collection system 224 to call the purchaser if the invoice is less than seven days from coming due. The action may be to split an order to reduce the total value of each order. In some implementations, performing a remedial action may notify a selling agent who was responsible for the order. For example, a selling agent may have been responsible for selling one million widgets to ABC Retailer. When the user of the ordering system 218 splits the order into two orders, the ordering system 218 may provide a notification to the selling agent that the user is splitting the order. The selling agent may then use that information in future sales to ensure that unintended fulfillment outcomes may be less likely to occur.

The billing system 221 includes a prediction processor 239, action identifier 242, action database 245, and prediction thresholds 248. The billing system 221 receives order details from the ordering system 218 after the user of the ordering system has performed the remedial actions identified by the action identifier 230. The prediction processor 239, action identifier 242, action database 245, and prediction thresholds 248 operate in a similar manner to the corresponding prediction processor 227, action identifier 230, action database 233, and prediction thresholds 236 of the ordering system 218. The prediction processor 239 applies a predictive model received from the customer specific model storage 215 to the order details received from the ordering system 218. The prediction processor 239 determines likelihoods of unintended fulfillment outcomes based on the received order details. The prediction processor 239 provides those likelihoods to the action identifier 242 that accesses the actions in the action database 245 and compares the likelihoods to the prediction thresholds 248 to identify the remedial actions to instruct the user operating the billing system 221 to perform. As an example, a remedial action may be to send a pro-forma invoice to the purchaser a week before the actual bill is sent out.

The collection system 224 includes a prediction processor 251, action identifier 254, action database 257, and prediction thresholds 260. The collection system 224 receives order details from the billing system 221 after the user of the billing system 221 has performed the remedial actions identified by the action identifier 242. The prediction processor 251, action identifier 254, action database 257, and prediction thresholds 260 operate in a similar manner to the corresponding prediction processors 227 and 239, action identifiers 230 and 242, action databases 233 and 245, and prediction thresholds 236 and 248 of the ordering system 218 and billing system 221. The prediction processor 251 applies a predictive model received from the customer specific model storage 215 to the order details received from the billing system 221. The prediction processor 251 determines likelihoods of unintended fulfillment outcomes based on the received order details. The prediction processor 251 provides those likelihoods to the action identifier 254 that accesses the actions in the action database 257 and compares the likelihoods to the prediction thresholds 260 to identify the remedial actions to instruct the user operating the collection system 224 to perform. As an example, a remedial action may be to communicate with the sales agent to give the sales agent a status of the order so the sales agent can work with the customer to ensure timely payment.

In some implementations, only the action identifier 230 of the ordering system 218 identifies remedial actions. The action identifier 230 may identifier remedial actions to be performed by the billing system 221 and the collection system 224. In this instance, the action database 233 may include remedial actions that are also stored in the action database 245 and the action database 257 and that are performed at the billing and collection stages. The user operating the ordering system 218 may be responsible for entering instructions for the remedial actions to be performed later during the billing and collection stages. Alternatively, the ordering system 218 may save the remedial actions to be performed later during the billing and collection stages and present the remedial actions during the billing and collection stages.

Figure 3:
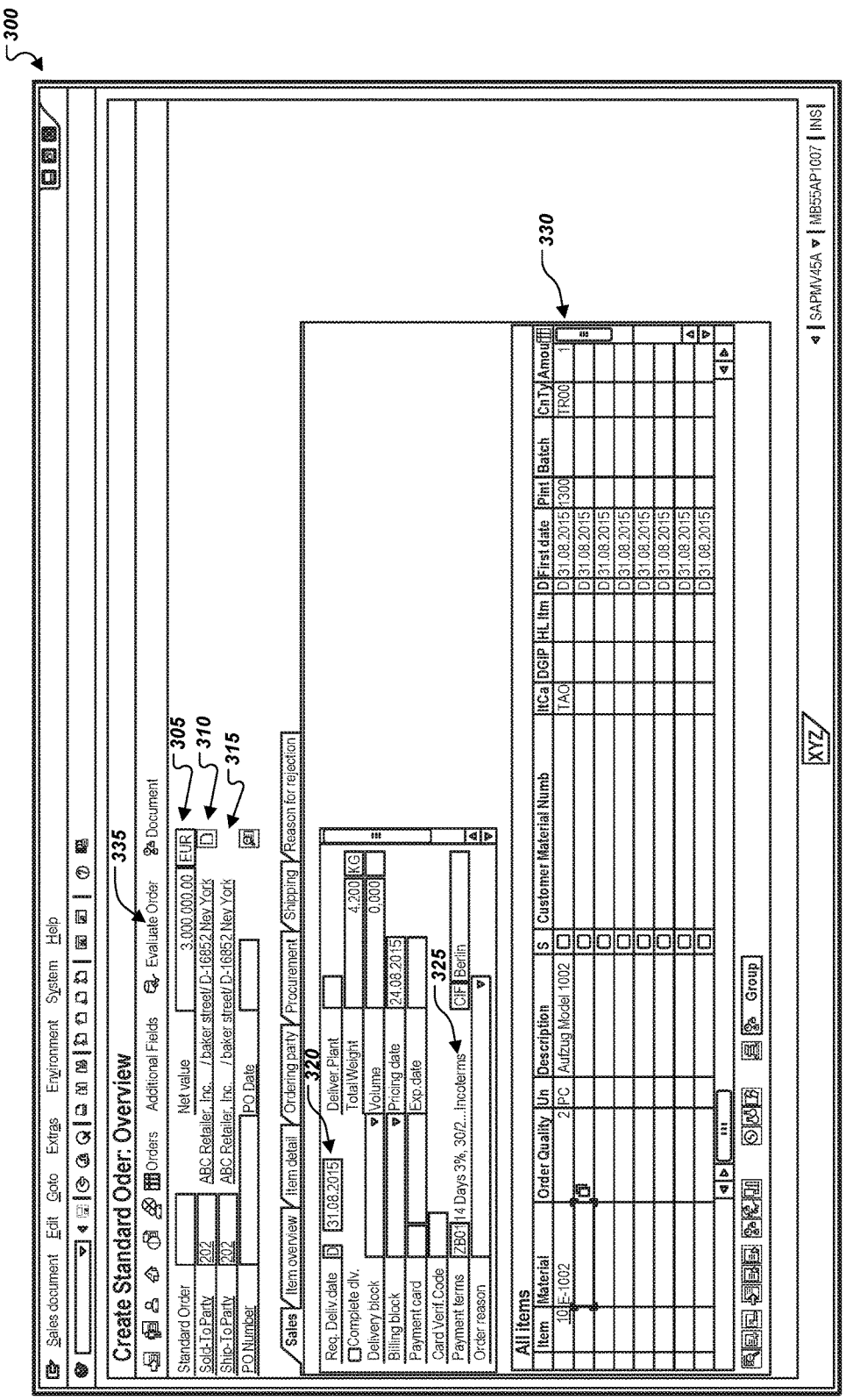

FIG. 3 illustrates an example user interface 300 for processing and invoicing orders for goods. The user interface 300 is an interface of an ordering system 106 or 218 from FIG. 1 or 2. A user inputting an order from a purchaser inputs the order details into the user interface 300 for processing by the system.

The user interface 300 includes a total value field 305, purchaser field 310, and delivery field 315 where the user can enter order details. The total value field 305 displays the total value for the order as computing by the ordering system. The purchaser field 310 displays the company or entity is purchasing the goods. The delivery field 315 displays the company or entity that will receive delivery of the goods. The user interface 300 includes a delivery date field 320 where the user can enter the requested delivery date. The user interface 300 includes a payment terms field 325 where the user can enter the payment terms requested by the purchaser. Alternatively, the payment terms field 325 may be populated by the system with payment terms that the purchaser has already agreed to for other purchases.

The user interface 300 includes the item field 330 where the user enters the items ordered by the purchaser. The item field 330 includes sections for the item number, description, quantity, and various other details. Once the user inputting the order has entered all the order details, the user selects the evaluate order button 335. Selecting the evaluate order button 335 causes the system to apply a predictive model to identify likelihoods of unintended fulfillment outcomes.

Figure 4:
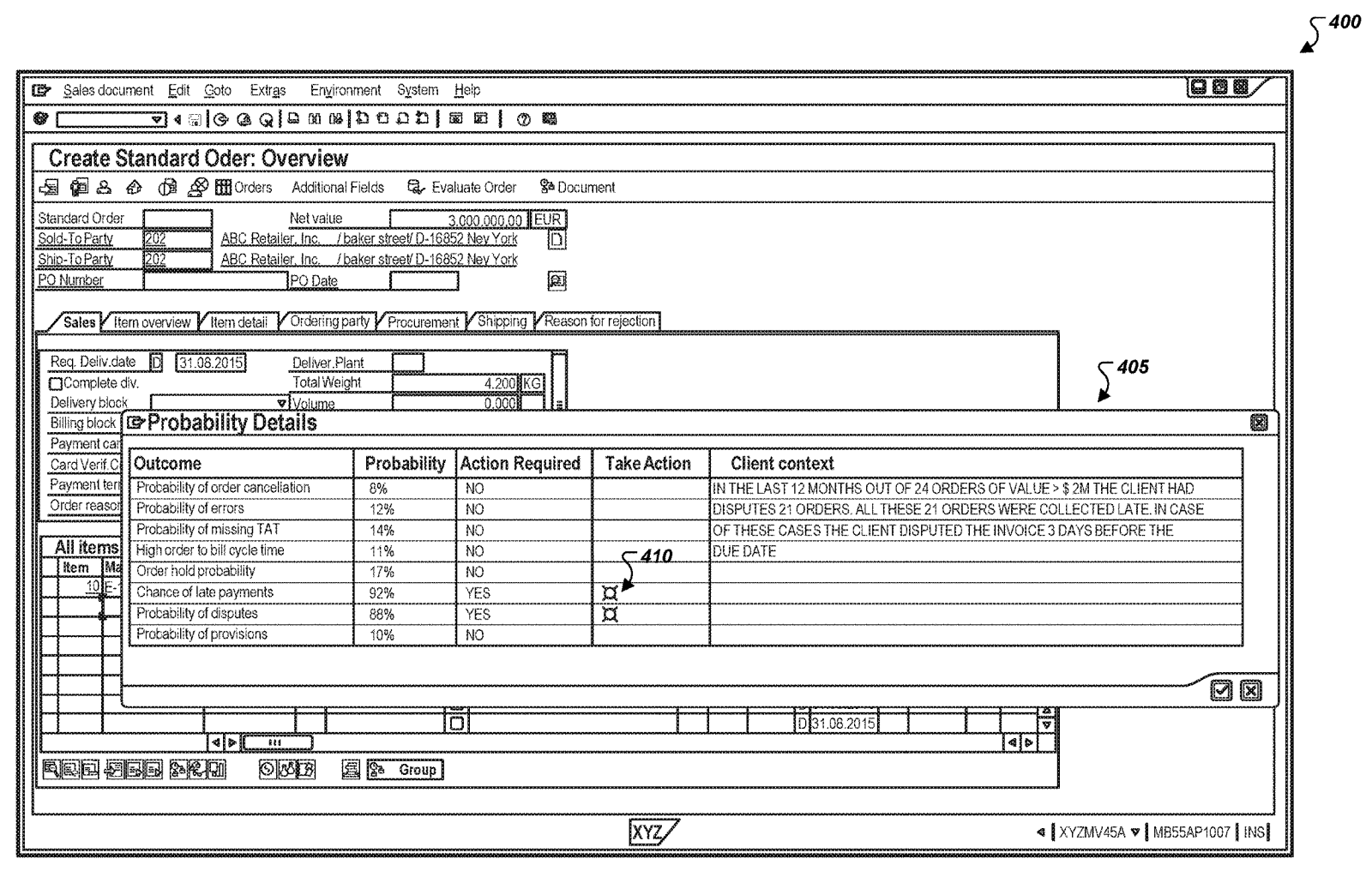

FIG. 4 illustrates an example user interface 400 for processing and invoicing orders for goods. The user interface 400 is an interface of an ordering system 106 or 218 from FIG. 1 or 2. Once the user has selected the evaluate order button 335 from FIG. 3, the system displays the details of the order evaluation in probability detail box 405 of user interface 400.

The probability detail box 405 includes the likelihoods of unintended fulfillment outcomes computed by the system. The probability detail box 405 includes instructions for the user whether or not action is required. For example, the probability detail box 405 indicates that the probability of the purchaser cancelling this order is eight percent. The system compared eight percent to the threshold, and because eight percent was below the threshold, the user inputting the order is not required to take a remedial action. The probability detail box 405 context information that displays the previous order history of the purchaser as the details relate to each unintended fulfillment outcome. For example, as related to the order cancellation entry, the purchaser has cancelled twenty-four orders of a value greater than two million in the past twelve months.

The probability detail box 405 includes probabilities for other unintended fulfillment outcomes such as errors in the order, problems with the turnaround time, order holding, payment dispute, late payment, high order frequency relative to billing cycle times, and order contingencies or provisions. Of the unintended fulfillment outcomes displayed in the probability detail box, the payment dispute and late payment outcomes correspond to probabilities that exceed a threshold and require that the user take action. The probability detail box 405 includes an action button 410 that the user can select to begin the process of performing an action to reduce the likelihood of the corresponding unintended fulfillment outcome.

Figure 5:
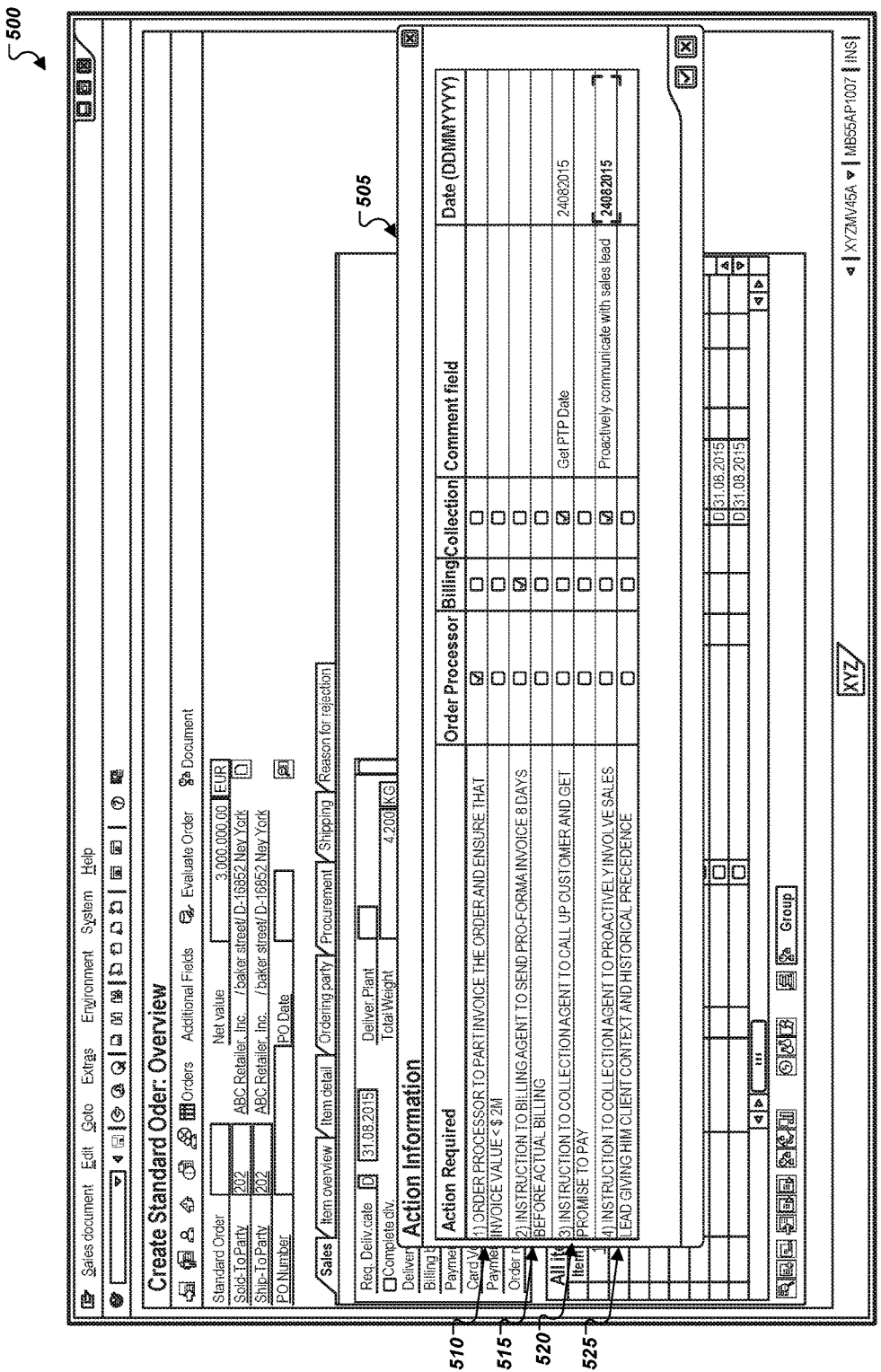

FIG. 5 illustrates an example user interface 500 for processing and invoicing orders for goods. The user interface 500 is an interface of an ordering system 106 or 218 from FIG. 1 or 2. Once the user has selected the action button 410 from FIG. 4, the system displays the required actions in action information box 505.

The action information box 505 includes a list of required actions to be performed by one or more users during the order processing, billing, and collection stages. Action 510 instructs the user to divide the order into smaller orders each with a value of less than two million dollars. Action 510 indicates that the user should perform the action during the order processing stage. Action 515 instructs the user to send a pro-forma invoice eight days before the user sends the actual invoice to the purchaser. Action 515 should be performed during the order processing and billing stage. For example, the user processing the order may input the instruction for the user to read during the billing stage. The billing user then sends the pro-forma invoice as instructed.

The action 520 instructs the user to call the purchaser and request a promise to pay date from the purchaser. Action 520 should be performed during the order processing and collection stage. Action 520 also includes a date entry. The user may enter the date that the user performed the action 520. The action 525 instructs the user to communicate with the sales agent to help ensure timely payment of the invoice. Action 525 should be performed during the order processing and collection stage. Similar to action 520, action 525 also includes a date entry where the user may enter the date that the user performed the action 525. Both action 520 and 525 include comment fields where the user can enter comments that other users may read during the process. For example, the user processing the order may have left the comment "Get PTP date" for the user at the collection stage to remind the collection user to call the customer to ask for a promise to pay date.

As noted above, during the order processing stage, the user inputting the order may receive remedial actions that are to be performed during the collection or billing stages. In this instance, the user may receive the remedial action and input instructions for a user during the collection or billing stage. For example, the user inputting the order may receive remedial actions 515, 520, and 525 and input instructions for a user to perform the remedial actions 515, 520, and 525 during either the collection or billing stage.

Figure 6:
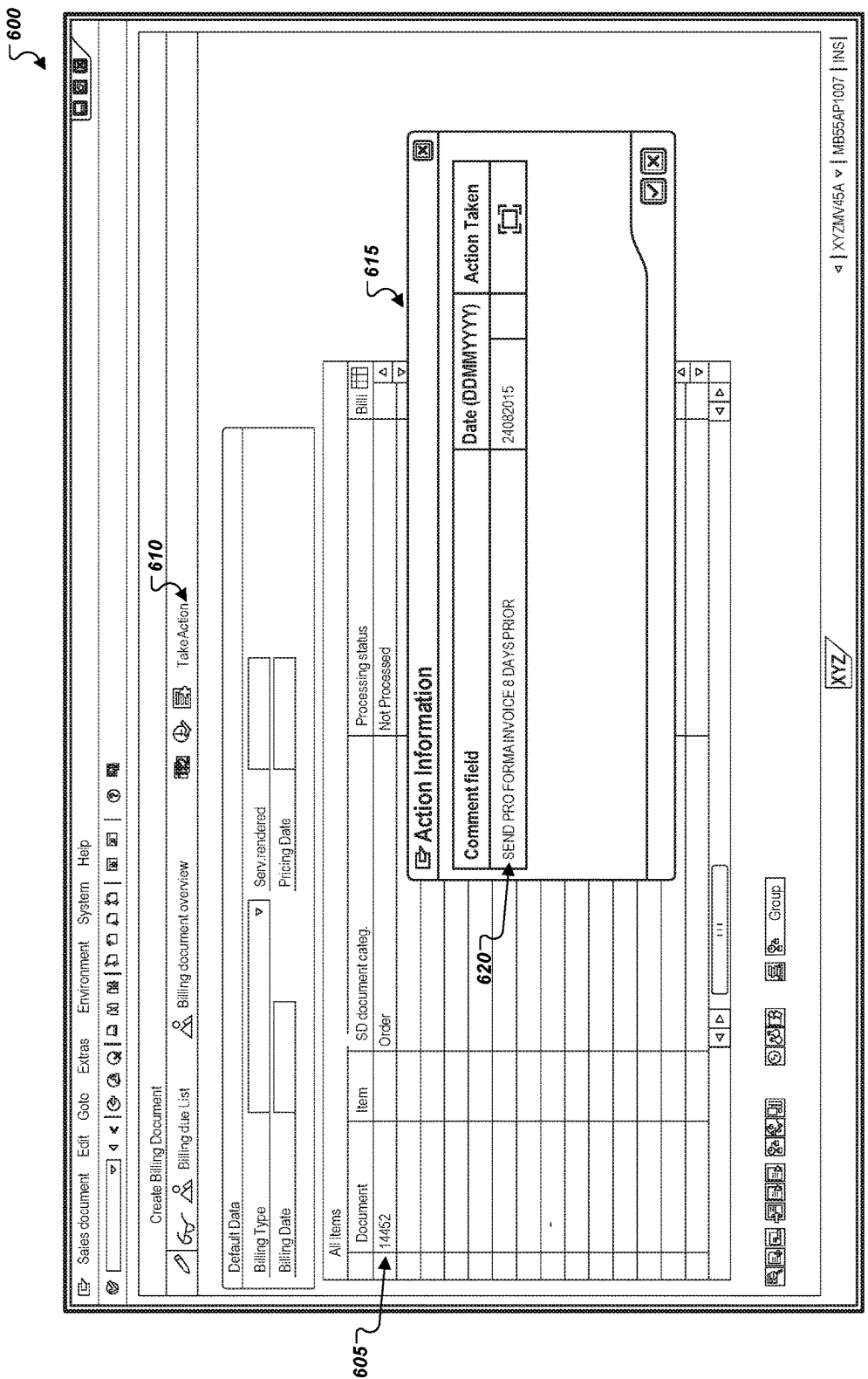

FIG. 6 illustrates an example user interface 600 for processing and invoicing orders for goods. The user interface 600 is an interface of billing system 127 or 221 from FIG. 1 or 2. The user interface 600 assists the user by listing orders that the user can select for which to generate invoices.

The user interface 600 includes a list of orders for which invoices should be sent. The list of orders is received from the ordering system. The user interface 600 includes one order 605. As shown in user interface 600, the order 605 has not been processes. The user may select the order 605 and select the take action button 610. By selecting the take action button 610, the user begins the process for generating and sending an invoice for the selected order. The billing system displays the action window 615 when the user selects the take action button 610. The action window 615 displays actions that the system has identified to reduce the likelihood of unintended fulfillment outcomes. For example, action 620 includes instructions for the user to send a pro-forma invoice eight days before sending the actual invoice. The action 620 includes a date for the user to enter when the action is performed or a target date for when the action should be performed. Once the user completes the action 620, the user may check the action taken box.

Figure 6A:
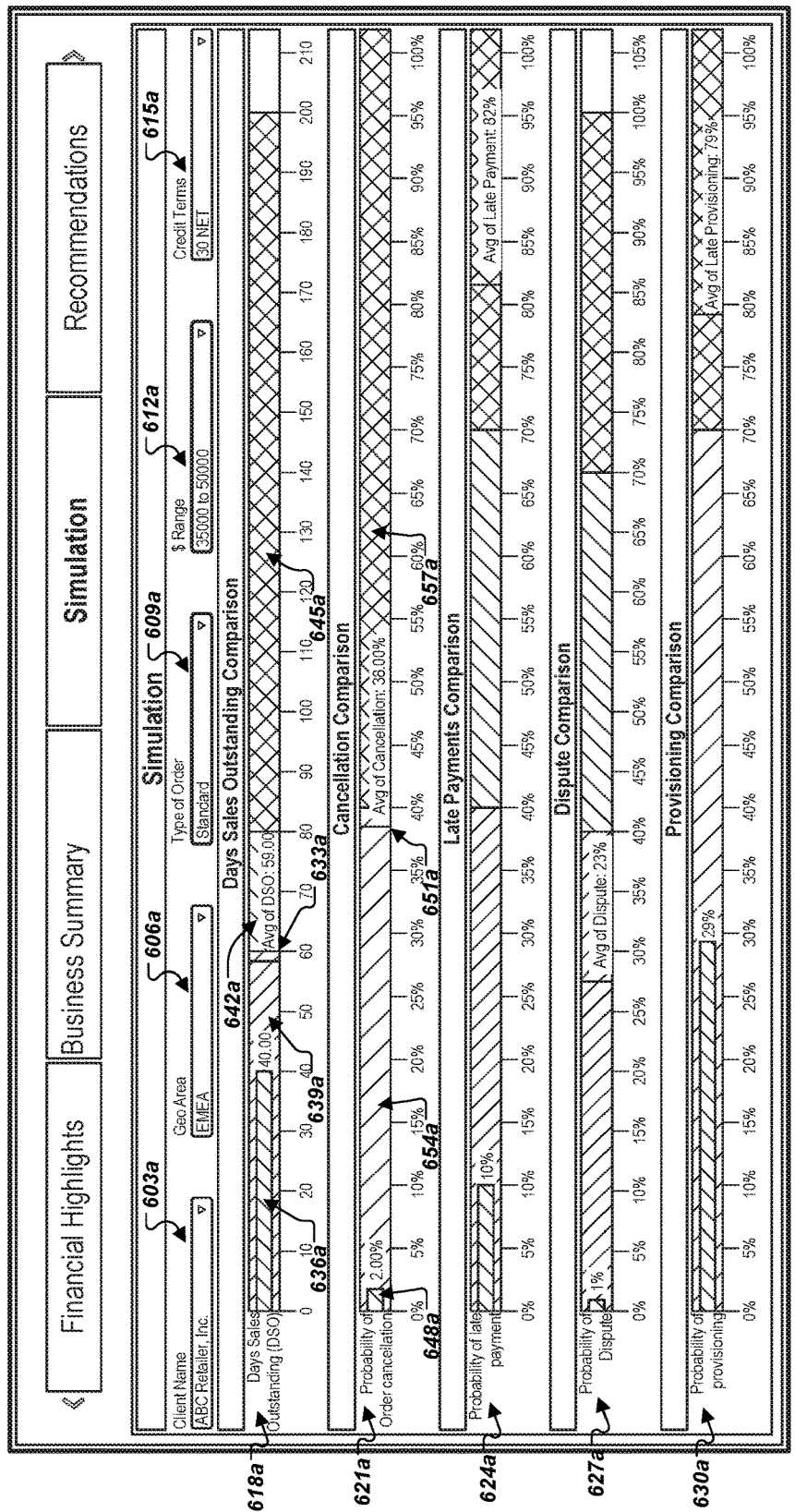

FIG. 6A illustrates an example user interface 600a for processing and invoicing orders for goods. The user interface 600a is an interface of a pre-sale system 157 from FIG. 1. The user interface 600a assists a selling agent by providing insight into potential problems that may arise during the ordering process. The selling agent provides potential order details to the pre-sale system and the pre-sale system applies the predictive model to identify the potential problems.

The user interface 600a represents an order simulation based on the order details inputted by the sales agent. The sales agent inputs a client name 603a, geographic area 606a, order type 609a, price range 612a, and credit terms 615a. The client name 603a may be selected from the seller's previous clients. The selectable clients may only be the ones that the system has collected sufficient previous orders from which to generate a predictive model. The geographic area 606a may correspond to the delivery location for the goods or the location of the client. The credit terms 615a may correspond to the payment method of the client such as payment required in thirty days or ninety days.

Based on the details entered by the sales agent, the user interface 600a displays the likelihoods of various unintended fulfillment outcomes. The days sales outstanding bar 618a indicates that the average days that an invoice is outstanding for the client ABC Retailer is fifty-nine as shown with the average indicator 633a. Using the order details entered by the sales agent, the predicted number of days is forty as shown with the prediction bar 636a. The prediction bar 636a may be color coded blue, as represented by a forward slash pattern, to distinguish the prediction bar 636a from the other portions of the days sales outstanding bar 618a. The days sales outstanding bar 618a may be color coded so that the sales agent can quickly view whether the order details place the prediction in a desired range. In user interface 600a, different background patterns may represent different colors. Region 639a may be green to indicate the target region as represented by a backward slash pattern. Region 642a may be colored yellow, as also represented by a forward slash pattern, to indicate that the days outstanding is not in the target region, but also not in the unintended region. Region 645a may be red, as represented by a crosshatch pattern, to indicate the days outstanding should not be in that region. The regions may be set by the seller. For example, a seller may be comfortable with the days sales outstanding of less than ninety and not allow sales with days sales outstanding of greater than one hundred twenty.

The probability of order cancellation bar 621a indicates the probability of a cancelled order 648a based on the inputted order details as two percent. The average cancellation probability is thirty eight percent as indicated by the average indicator 651a. Unlike the days sales outstanding bar 618a, the cancellation bar 621a includes a region 654a that may be colored grey as represented by a wide-spaced backward slash pattern. This region 654a may indicate that the system did not receive any data for probabilities in this region 654a. Region 657a may be red to indicate that probabilities in that region should be avoided by the sales agent.

The probability of late payment bar 624a, the probability of dispute 627a, and the probability of provisioning bar 630a includes similar features to the days sales outstanding bar 618a and probability of order cancellation bar 621a. Portions of each bar with similar patterns may indicate targets or regions to avoid. In some implementations, the user interface 600a may provide the sales agent with recommendations to avoid the unintended regions such as regions 645a and 657a. For example, a sales agent may enter an order total of twenty million dollars. By applying the predictive model, the system determines the probability of a twenty million dollar order being cancelled is seventy five percent.

The system may determine that order totals of between thirty and forty million dollars and ten and fifteen million dollars have cancellation probabilities of less than twenty percent. The system may recommend that the sales agent negotiation for an order total in that range.

Regarding payment plans, the system may determine that the client selected in the client name 603*a* does not pay on time. The system may have financial details related to this client such as the company not having substantial cash deposits. The system may recommend the sales agent negotiate a short credit term and possible late payment penalties to encourage timely payment. The system may provide the sales agent insight into previous discounts provided to the client. For example, the system may indicate that no discounts have been extended to the client. In this instance, the system may recommend extending a discount to the client only if the client promises to pay within thirty days. The system may provide a recommendation to avoid order disputes. In this instance, the probability of an order dispute is one percent. The system may recommend that the sales agent receive confirmation for the order with the goal of eliminating the possibility of a dispute. In some implementations, the system may also provide the sales agent with how the order affects the financial details of the selling company. For example, the system may indicate that a possible order entered by the sales agent will increase the selling company's profits by one hundred thousand dollars. The system may recommend adjustments to the order to increase the selling company's profits.

Figure 7:
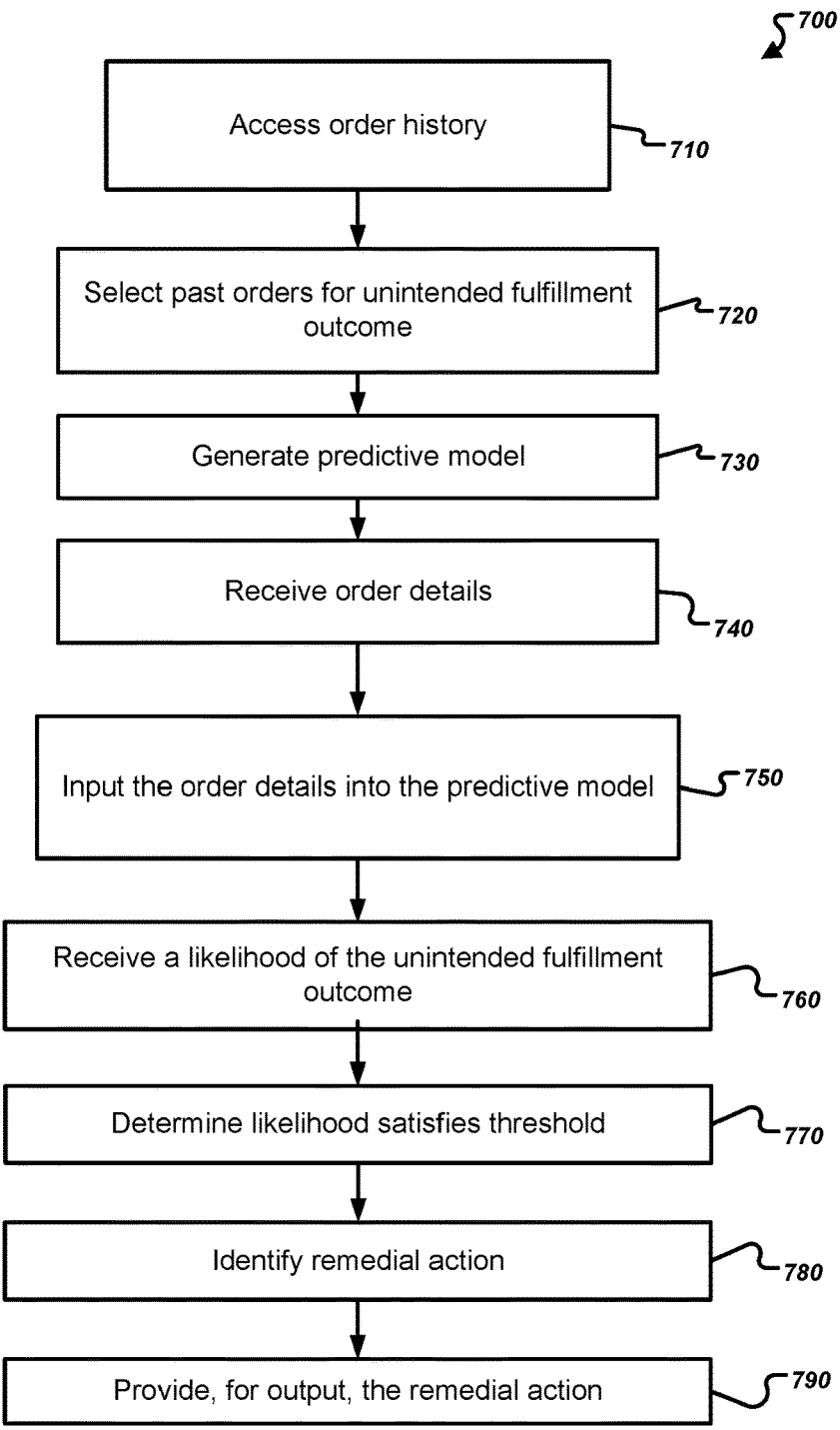
FIG. 7 illustrates an example process for processing and invoicing orders for goods.

FIG. 7 is a flow chart of an example process 700 for processing and invoicing orders for goods. In general, the process 700 provides actions for users to perform to reduce a likelihood of a goods order end up at an unintended fulfillment outcome. The process 700 will be described as being performed by a computer system comprising one or more computers, for example, the systems 100 or 200 as shown in FIG. 1 or 2.

The system accesses an order history that, for each of one or more past orders, indicates (i) one or more order details associated with the order, and (ii) a fulfillment outcome associated with the order, wherein the order fulfillment outcome is selected from among multiple pre-defined order fulfillment outcomes including one or more intended order fulfillment outcomes and one or more unintended order fulfillment outcomes (710). In some implementations, the one or more unintended order fulfillment outcomes includes order cancellation, errors in the order, problems with the turnaround time, order holding, payment dispute, late payment, high order frequency relative to billing cycle times, order contingencies or provisions, or other similar outcomes. In some implementations, the one or more intended order fulfillment outcomes includes the goods being delivered on time and payment being received on time.

The system, for each of one or more particular unintended order fulfillment outcomes, selects one or more particular past orders that are associated with the particular unintended order fulfillment outcome (720). For example, the system selects all the orders that had invoices that were paid late or that were cancelled. The system, for each of the one or more particular unintended order fulfillment outcomes, generates, using the one or more order details associated with the one or more particular past orders that are associated with the particular unintended order fulfillment outcome as training data, a predictive model that is trained to estimate, based on one or more given order details associated with a given order, a likelihood that the given order will be associated with the particular unintended order fulfillment outcome (730). The system generates the predictive model based on statistical techniques such as logistic regression, support vector machine, random forest, multiple linear regression, neural networks, and Bayes' theorem. In some implementations, the predictive model is specific to a purchaser.

The reason that some of the orders end with an unintended order fulfillment outcome varies. There may have been a disagreement in price between the seller and the buyer. The sales agent may have made a verbal promise that is not reflected in the invoice. The user receiving the order may be unfamiliar with the order taking process or how to enter an order into the system. The seller may not have the resources, parts, or capacity available to process the order. The purchaser may have exhausted a credit limit. Some invoices that are over a certain amount may need special authorization before the purchaser can pay. The attempts to identify these problems and any other ones that may lead to an unintended order fulfillment outcome.

The system receives one or more order details associated with a subsequently received order (730). The system, for each of the predictive models, provides the one or more order details as input to the predictive model (740). The system, in response to providing the one or more order details as input to the predictive model, receives, from each of the predictive models, a likelihood that the one or more order details will be associated with the particular unintended order fulfillment outcome (750). In some implementations, the likelihood is represented by a probability. The higher the probability, the better the chance of the particular unintended order fulfillment outcome. For example, the chance of the order being disputed may be ninety percent.

The system determines, for each indication of the likelihood, whether the likelihood satisfies a threshold (760). In some implementations, the seller selects the thresholds based on the seller's goals and risk tolerance. For example, a seller may not want the chance of an order being cancelled to be above fifty percent. The seller may have a higher tolerance for an order being placed on hold, such as seventy-five percent.

The system, for likelihoods that satisfy the threshold, identifies a remedial action that, when implemented, adjusts the likelihood to not satisfy the threshold (770). In some implementations, the remedial action is dividing an order, generating a target invoice date, notifying a purchaser of an outstanding invoice, or applying a discount. The system may identify the remedial action from a group of remedial actions that the seller has identified. The remedial action may be an action that the seller should take during the order taking stage, the billing stage, or the collection phase. The system provides, for output, data indicating the remedial action (780). In some implementations, the system may require the user to perform the remedial action before the user can proceed further with processing the invoice.

Figure 8:
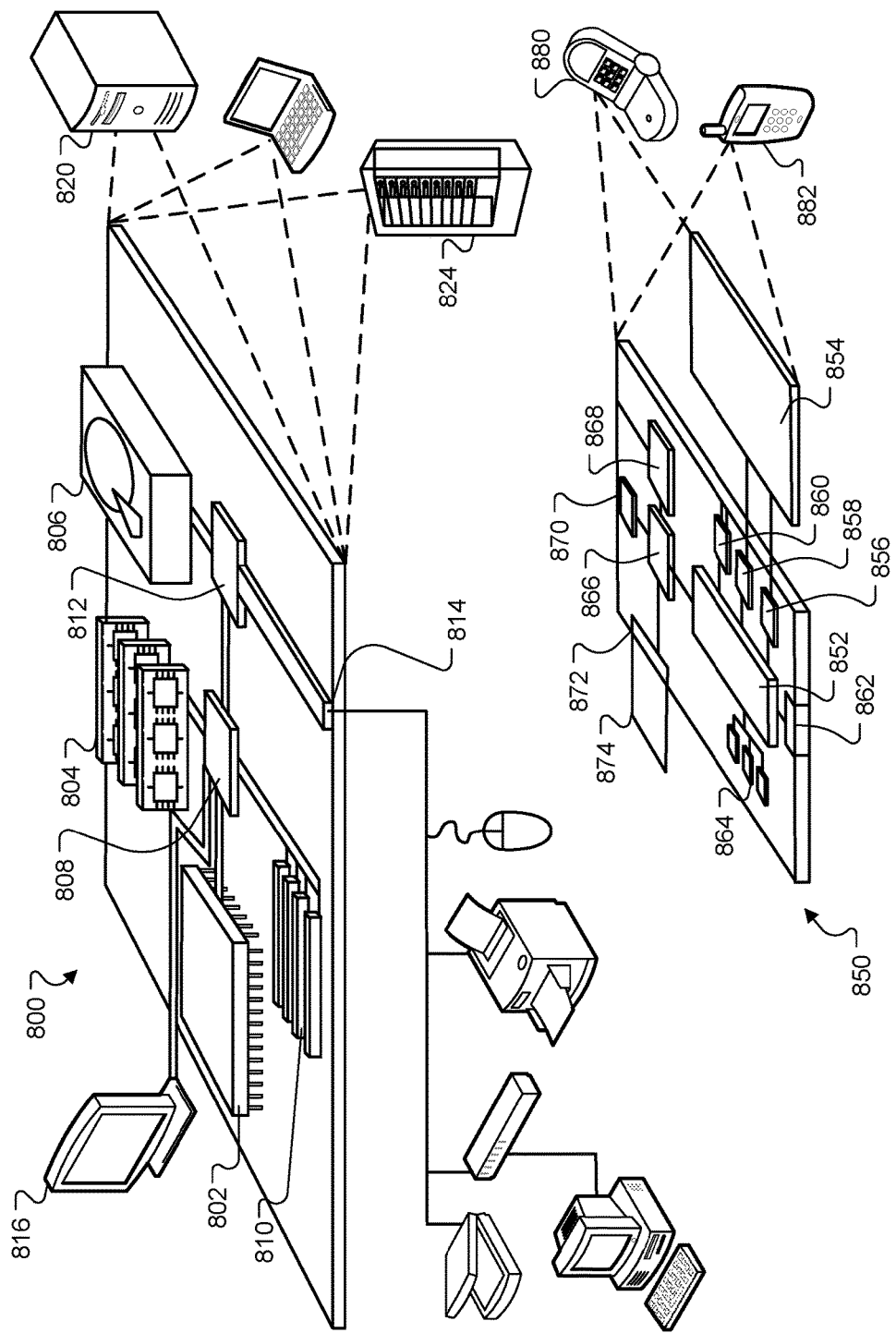
FIG. 8 illustrates an example of a computing device and a mobile computing device.

FIG. 8 shows an example of a computing device 800 and a mobile computing device 850 that can be used to implement the techniques described here. The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 802), perform one or more methods, such as those described above. The instructions can also be stored by one or more storage devices such as computer- or machine-readable mediums (for example, the memory 804, the storage device 806, or memory on the processor 802).

The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provide as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 852), perform one or more methods, such as those described above. The instructions can also be stored by one or more storage devices, such as one or more computer- or machine-readable mediums (for example, the memory 864, the expansion memory 874, or memory on the processor 852). In some implementations, the instructions can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, WiFi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
   accessing an order history that, for each of one or more past orders, indicates (i) one or more order details associated with the order, and (ii) a fulfillment outcome associated with the order, wherein the order fulfillment outcome is selected from among multiple pre-defined order fulfillment outcomes including one or more intended order fulfillment outcomes and one or more unintended order fulfillment outcomes;
   for each of one or more particular unintended order fulfillment outcomes, selecting one or more particular past orders that are associated with the particular unintended order fulfillment outcome;

for each of the one or more particular unintended order fulfillment outcomes, generating, using the one or more order details associated with the one or more particular past orders that are associated with the particular unintended order fulfillment outcome as training data, a predictive model that is trained to estimate, based on one or more given order details associated with a given order, a likelihood that the given order will be associated with the particular unintended order fulfillment outcome;

receiving one or more order details associated with a subsequently received order;

for each of the predictive models, providing the one or more order details as input to the predictive model;

in response to providing the one or more order details as input to the predictive model, receiving, from each of the predictive models, a likelihood that the one or more order details will be associated with the particular unintended order fulfillment outcome;

determining, for each indication of the likelihood, whether the likelihood satisfies a threshold;

for likelihoods that satisfy the threshold, identifying a remedial action that, when implemented, adjusts the likelihood to not satisfy the threshold; and providing, for output, data indicating the remedial action.

2. The method of claim 1, wherein the one or more order details comprise goods ordered, a quantity of each good, a total value, and a purchaser.

3. The method of claim 1, wherein the predictive model is purchaser specific.

4. The method of claim 1, wherein the one or more unintended order fulfillment outcomes comprise late payment, order dispute, and order cancellation.

5. The method of claim 1, wherein the remedial action comprises dividing an order, generating a target invoice date, notifying a purchaser of an outstanding invoice, or applying a discount.

6. The method of claim 1, comprising:
preventing an order associated with the one or more order details from processing until execution of the remedial action.

7. The method of claim 1, wherein the remedial action is associated with an order receiving stage, a billing stage, or a collection stage.

8. A system comprising:
one or more computers and one or more storage devices storing instructions that are operable, when executed by the one or more computers, to cause the one or more computers to perform operations comprising:
accessing an order history that, for each of one or more past orders, indicates (i) one or more order details associated with the order, and (ii) a fulfillment outcome associated with the order, wherein the order fulfillment outcome is selected from among multiple pre-defined order fulfillment outcomes including one or more intended order fulfillment outcomes and one or more unintended order fulfillment outcomes;

for each of one or more particular unintended order fulfillment outcomes, selecting one or more particular past orders that are associated with the particular unintended order fulfillment outcome;

for each of the one or more particular unintended order fulfillment outcomes, generating, using the one or more order details associated with the one or more particular past orders that are associated with the particular unintended order fulfillment outcome as training data, a predictive model that is trained to estimate, based on one or more given order details associated with a given order, a likelihood that the given order will be associated with the particular unintended order fulfillment outcome; and using one or more of the predictive models to estimate a likelihood that a subsequently received order will be associated with one or more of the unintended order fulfillment outcomes.

9. The system of claim 8, wherein the one or more order details comprise goods ordered, a quantity of each good, a total value, and a purchaser.

10. The system of claim 8, wherein the predictive model is purchaser specific.

11. The system of claim 8, wherein the one or more unintended order fulfillment outcomes comprise late payment, order dispute, and order cancellation.

12. The system of claim 8, wherein the one or more intended order fulfillment outcomes comprises a timely, received payment.

13. The system of claim 8, wherein the predictive model is generated using logistic regression, support vector machine, random forest, multiple linear regression, Bayes' theorem.

14. A non-transitory computer-readable medium storing software comprising instructions executable by one or more computers which, upon such execution, cause the one or more computers to perform operations comprising:
accessing, for each of one or more particular unintended order fulfillment outcomes, a predictive model that is trained to estimate, based on one or more given order details associated with a given order, a likelihood that the given order will be associated with the particular unintended order fulfillment outcome;

receiving one or more order details associated with a subsequently received order;

for each of the predictive models, providing the one or more order details as input to the predictive model;

in response to providing the one or more order details as input to the predictive model, receiving, from each of the predictive models, a likelihood that the one or more order details will be associated with the particular unintended order fulfillment outcome;

determining, for each indication of the likelihood, whether the likelihood satisfies a threshold;

for likelihoods that satisfy the threshold, identifying a remedial action that, when implemented, adjusts the likelihood to not satisfy the threshold; and providing, for output, data indicating the remedial action.

15. The medium of claim 14, wherein the one or more order details comprise goods ordered, a quantity of each good, a total value, and a purchaser.

16. The medium of claim 14, wherein the predictive model is purchaser specific.

17. The medium of claim 14, wherein the one or more unintended order fulfillment outcomes comprise late payment, order dispute, and order cancellation.

18. The medium of claim 14, wherein the remedial action comprises dividing an order, generating a target invoice date, notifying a purchaser of an outstanding invoice, or applying a discount.

19. The medium of claim 14, wherein the operations further comprise:
preventing an order associated with the one or more order details from processing until execution of the remedial action.

20. The medium of claim 14, wherein the remedial action is associated with an order receiving stage, a billing stage, or a collection stage.

\* \* \* \* \*